May 12, 1964     E. H. MAGESTER     3,132,382
RESIN FOAM INSULATED CABINET
Filed Sept. 13, 1962
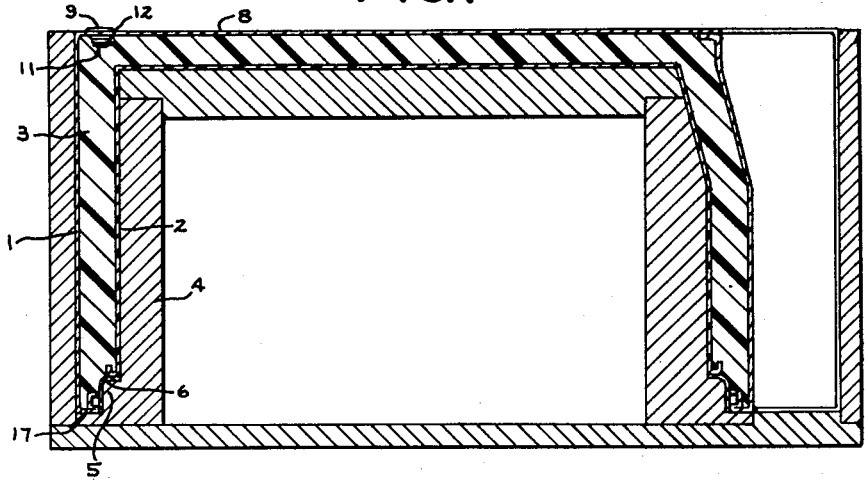
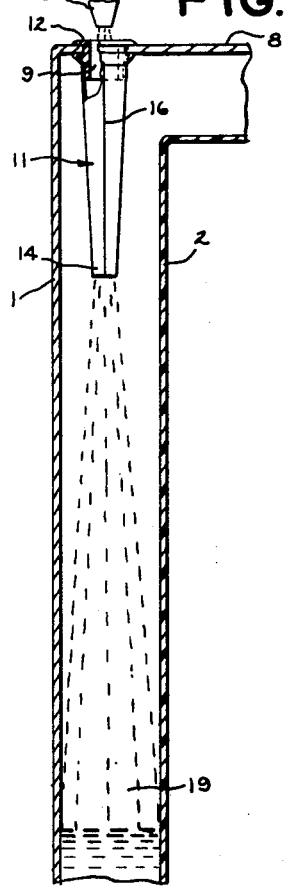
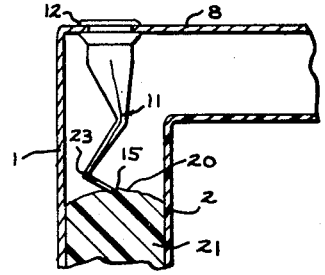
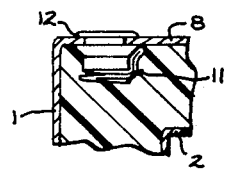
INVENTOR.
EARL H. MAGESTER
BY Walter Hule
HIS ATTORNEY

United States Patent Office

3,132,382
Patented May 12, 1964

3,132,382
RESIN FOAM INSULATED CABINET
Earl H. Magester, Louisville, Ky., assignor to General
Electric Company, a corporation of New York
Filed Sept. 13, 1962, Ser. No. 223,397
3 Claims. (Cl. 18—39)

The present invention relates to a cabinet or the like including walls filled with a foamed resin insulating material and is more particularly concerned with means for automatically sealing the pour hole or opening in the outer shell of a refrigerator cabinet through which a foamable resin mixture is introduced into the walls of the cabinet.

Certain types of foamed polyurethane resins have properties which make them particularly useful as heat insulating materials. The heat insulating properties of these resin foams are further improved when the foams are produced under pressure instead of being allowed to freely expand. Accordingly, polyurethane foams intended for heat insulating purposes are normally prepared by introducing the foam producing ingredients in liquid form into the hollow structure or mold formed by the spaced shell and liner of a cabinet or the like and allowing the material to foam and cure under a self generated pressure of a few pounds per square inch in order to provide a cellular material having maximum insulating properties. In the manufacture of a foam insulated refrigerator cabinet in which the polyurethane or other foam producing resin is foamed and cast within the spaces between the liner or liners forming the food storage compartments and the outer shell or case and in which these components in effect form the walls of the mold, the cabinet liner or liners and the shell are arranged in spaced relationship with one another and the foamable resin is introduced through one or more pour holes or openings. During initial rise of the foam, the gases such as air and a small amount of gaseous foaming agent contained within the hollow interior of the walls are allowed to escape through the pour opening as otherwise these trapped gases will prevent the foam from filling all of the structure and will also decrease the ultimate pressure under which the foam is finally generated. After the proper amount of liquid foamable material is introduced, and sufficient time has elapsed for the escape of the air and other gaseous materials, the pour hole or opening is plugged to prevent the escape of the foam and to permit the generation of the desired pressures within the cavity. After the foaming operation has been completed these plugs are removed and the openings sealed with a decorative cap or closure member.

The present invention has its principal object the provision of means which will automatically close and seal the pour hole or holes after the desired amount of air and other gaseous materials have been allowed to escape from the mold, which sealing means becomes a permanent part of the final foamed structure.

Another object of the present invention is to provide, in combination with a mold or hollow structure in which a foamable resin is expanded under pressure, an improved valve means adapted to permit the escape of air and other gases during the initial foaming reaction and thereafter, by contact therewith of the foaming resin, to close and seal the pour opening.

A more specific object of the invention is to provide an automatic pour hole sealer which is adapted to permit the escape of air and other gases from a mold during initial foaming of a resin material therein and which automatically closes the pour hole during the final stages of the foaming.

Further objects and advantages of the present invention will become apparent as the following description proceeds and the features of novelty which characterize the invention will be pointed out with particularity in the claims annexed to and forming a part of this specification.

In accordance with the present invention there is provided a mold for forming a resin foam under pressure, which mold includes walls forming a closed cavity. At least one pour hole is provided in the top wall of the cavity for introducing a foamable liquid resinous material into the mold. For the purpose of automatically sealing the pour hole during expansion of the foam formed within the mold, a flexible, pliable tube of gas impervious material, such as polyethylene, is arranged in the pour hole in such a manner that the foamable liquid resin can be introduced into the mold through the tube. The lower end of the tube is adapted to hang freely in the mold in spaced relationship with the bottom of the mold and the lower end of the tube is flattened so that after introduction of the liquid resinous material and the escape of air or other gases from the mold during the initial foaming operation, contact of the lower end portion of the tube by the expanding resin will cause the tube to be folded transversely to seal the tube and prevent further escape of any material through the pour hole and also to fold across the pour hole and form an effective seal of the pour hole.

For a better understanding of the invention reference may be had to the accompanying drawing in which:

FIGURE 1 is a view, in section, of an insulated refrigerator cabinet manufactured in accordance with the present invention;

FIGURE 2 is a perspective view of an automatic foam pour hole sealer forming part of the present invention;

FIGURE 3 is a sectional view of a portion of the cabinet shown in FIGURE 1 illustrating one step in the foaming operation employing the present invention;

FIGURE 4 is a view similar to FIGURE 3 illustrating a subsequent step in the operation of the present invention; and FIGURE 5 is an enlarged sectional view illustrating the final sealing of a pour hole by the pour hole sealing means of the present invention.

While the present invention is applicable to the mold filling of any hollow structure or mold with a resin foam which can be poured into a hollow structure or mold prior to foaming and then caused to expand in the mold, it will be particularly described in a preferred application in which hollow walls defined by the spaced shell and liner of a refrigerator cabinet are filled with a liquid foamable resinous material such as a polyurethane resin. The formation of cellular or foamed bodies from liquid polyester or polyether polyurethane reaction mixtures is well known. The polyester polyurethane resins, for example, are made by reacting a slightly branched polyester with a di-isocyanate or by reacting a linear polyester with a mixture of di- and tri-isocyanates to form cross-linked solid resinous products. In one method of producing a polyurethane foam, a slight excess of di-isocyanate is employed and a small amount of water added for reaction with the excess isocyanate to generate carbon dioxide as the foaming or expanding gas. In a second method of making these polyurethane foams, a vaporizable liquid such as a halogenated alkene is dispersed or dissolved in one of the reactants so that its vaporization by the heat of the resin-forming reaction will provide the desired foam structure. Since the resinifying reaction takes place rather fast, the foams are preferably produced from the polyester and isocyanate components by bringing together streams of the two components, and immediately introducing the mixture into a suitable mold or other form. The catalyst or activator and the foam generating material are included in one or the other component of the mixture prior to the actual mixing operation. When a halogenated alkane is employed as the foaming agent, it is preferably mixed in an autoclave with the polyester. Various halogenated alkanes, such as dichloromonofluoromethane, dichlorotetrafluoroethane, can be employed. A preferred halogenated alkane is trichloromonofluoromethane having a boiling point of 74.8° F. since it also has the property of remaining within the cells of a polyurethane foam to improve its heat insulating values.

With reference to FIGURE 1 of the drawing, there is shown in section a refrigerator cabinet including a shell 1 and a liner 2 spaced from the shell. The spaces between the shell 1 and the liner are filled with a foamed resin insulating material 3 formed in situ within these spaces. This cabinet is illustrated in the position in which it is foamed, that is, the foamable resin is introduced within the cabinet resting on its face in a horizontal position. Prior to the introduction of the foam, the liner 2 is positioned on a backing member 4 for supporting the walls of the liner during the foaming operation and the outer shell 1 is placed over the liner and positioned relatively thereto by means of the shoulder 5 on the bottom portion of the backing member 4. A suitable sealing means 6 is provided between the edges of the liner and the edges of the shell surrounding the access opening to the cabinet for the purpose of sealing this space against the loss of foam and to permit separation of the foamed cabinet from the backing member 4.

Thus assembled, the spaced liner and the shell of the refrigerator cabinet in effect form a closed mold of a type in which the mold walls are part of the final molded product. For the purpose of introducing a foamable resinous mixture into the spaces between the liner and the shell, the back wall 8 which in effect forms the top wall of the mold when the cabinet is resting on its face, is provided with at least one pour hole 9 through which a foam producing resinous material is introduced for expansion within the hollow walls of the cabinet. After this foamable resinous material has been introduced into the mold and the air or most of the air originally present in the mold along with a small amount of gaseous foaming agent is permitted to escape during initial expansion of the resinous material, it is desirable that the pour hole be closed in order that the maximum insulating properties of the foamed resin be developed by carrying out the final expansion under pressure.

In accordance with the present invention, these results are obtained by means of an automatic pour hole sealer in the form of a pliable tube 11 of polyethylene or the like which is supported or anchored in the pour hole by means of a rigid collar 12. In the illustrated embodiment of the invention, one end of the polyethylene tube 11 is heat sealed or otherwise secured to the outer surface of the collar 12 and the collar 12 is then inserted into the pour hole 9 so that the lower end 14 of the polyethylene tube hangs freely downwardly into the one wall of the cabinet. The primary purpose of the collar 12 is to anchor the tube 11 in the pour hole so that the manner in which the tube is secured to the collar or whether it is merely held in the pour hole by insertion of the collar into the tube 11 after the tube is placed in the pour hole 9 is not material. Also while polyethylene is a preferred material for the tube since it is a flexible and easily foldable material and is readily available in the required form, it is to be understood that the invention is not limited thereto. Any pliable, flexible and readily foldable material which can be provided in tubular form can be employed provided it is sufficiently pliable so that it will fold laterally when only a slight pressure is applied to the lower end 14 thereof.

As is indicated in FIGURE 2 of the drawing, the lower end 14 of the polyethylene tube is flattened. Flattened thin-walled polyethylene tubing of this type is available on the market and is supplied in rolls so that the preformed creases 16 in the flattened tube are relatively sharp and tend to cause the flattened tube to maintain its flattened configuration or to resume its flattened configuration after being opened to a more circular form.

The length of the tube 11 depends upon the dimensions of the mold or more specifically the distance between the top wall of the mold as represented for example in the illustrated embodiment by the back 8 of the cabinet and that portion 17 of the face of the cabinet opposite to or more specifically below the pour hole 9. The tube 11 should be of a length such that when the required charge of foamable resinous material has been introduced into the mold, the lower or tip end 15 thereof is above the level of the foamable resin mixture at this time to permit the initial escape of air through the tube. On the other hand it should be sufficiently long so that when the resinous mixture foams into contact with the lower tip 15 a continued rise of the foam will cause the tube to bend or fold along one or more horizontal or transverse lines.

The advantages of the present invention will become more apparent from a consideration of the manner in which the pour hole sealer operates during the formation of the resin foam.

First with reference to FIGURE 3, after the shell 1 and liner 2 have been assembled in their desired positions relative to one another and the pour hole sealing means has been positioned in the pour hole 9 with the bottom edge 15 thereof hanging freely and substantially spaced from that portion of the mold below the pour hole, the foamable resinous material such as a foamable polyurethane resin is introduced from a nozzle 18 into the hollow walls of the cabinet through the polyethylene tube 11. Since the tube is quite pliable, the flattened lower portion 14 readily opens to allow the liquid resinous material to flow freely into the mold. When initially introduced into the mold, this resinous material is in the liquid form and fills only the bottom portions of the mold as indicated by the numeral 19. Within a matter of seconds after it is introduced, the liquid resin begins to foam or expand and at the same time begins to become less fluid, passing first through a soft gel stage, then a harder gel stage and finally to the solid state. As the resin expands, the air displaced by the expanding resin escapes through the tube 11 which normally is held partly open due to the presence of a thin film of the liquid resinous material remaining on the inner surfaces of the tube.

When the upper surface of the expanding resin indicated by the numeral 20 in FIGURE 4 finally comes in contact with the lower edge or outlet end 15 of the tube 11, the pressure of the continuously expanding mass of resinous material indicated by the numeral 21 causes the tube 11 to fold about one and then a plurality of fold lines 23 which prevent further escape of air or other gases through the pour hole 9. As a result, further expansion of the resinous mass 21 is carried out under a pressure generated by the expanding mass itself. Continued expansion or rise of the foam continues to raise the lower end of the tube and cause the tube to fold back and forth upon itself until these folded portions are finally forced upwardly by the foam into engagement with the lower edge of the collar 12 as illustrated in FIGURE 5 of the drawing. In this position and due to the increased rigidity of the foam when it has substantially filled the mold, the layers of the folded tube 11 extending across the pour hole 9 are sufficient to withstand the pressures of the expanded foam and the various folds 23 completely prevent the escape of foam through the pour hole. The entire operation insofar as the plugging of the pour hole 9 is concerned is completely automatic and the collar 12 and the folded tube 11 bridging the opening in the collar provide a permanent cap for sealing the pour hole against egress of moisture.

While the invention has been particularly described with reference to a particular embodiment thereof it is to be understood that various modifications can be made therein and it is intended by the appended claims to cover all such modifications as come within the scope and spirit of the invention.

What I claim as new and desire to secure by Letters Patent of the United States is:

1. A mold for forming a resin foam under pressure, said mold comprising walls including a top wall forming a closed cavity, said top wall including a pour hole, means including a flexible tube arranged in said pour hole for introducing a foamable resin into said mold, said tube hanging freely in said mold with the lower end of said tube spaced from the bottom of said mold and means for permanently securing said tube in sealing engagement with the edge of said pour hole, the lower end portion of said tube being flattened whereby it will fold transversely to seal said pour hole when contacted by the foamable resin during expansion thereof.

2. The mold of claim 1 in which said tube is composed of polyethylene film.

3. A mold for forming a polyurethane foam under pressure, said mold comprising walls including a top wall forming a closed cavity, a pour hole in said top wall of said cavity, a flexible tube of polyethylene arranged in said pour hole for introduction of a foamable polyurethane resin into said mold through said tube and hanging freely in said mold, and means for permanently securing said tube in sealing engagement with the edge of said pour hole, said lower end of said tube being spaced from the bottom of said mold.

References Cited in the file of this patent

UNITED STATES PATENTS

| | | |
|---|---|---|
| 1,883,880 | Cole | Oct. 25, 1932 |
| 2,129,983 | Bacon | Sept. 13, 1938 |
| 2,290,510 | Talalay | July 21, 1942 |